United States Patent
Suonvieri

[19]

[11] Patent Number: 6,047,181
[45] Date of Patent: *Apr. 4, 2000

[54] TIME DIVISION MULTIPLE ACCESS RADIO SYSTEM, METHOD FOR INTRACELL CAPACITY ALLOCATION, AND METHOD FOR PERFORMING AN INTRA-CELL HANDOVER

[75] Inventor: Jukka Suonvieri, Oulu, Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/578,657

[22] PCT Filed: Jun. 30, 1994

[86] PCT No.: PCT/FI94/00302

§ 371 Date: Jan. 5, 1996

§ 102(e) Date: Jan. 5, 1996

[87] PCT Pub. No.: WO95/02307

PCT Pub. Date: Jan. 19, 1995

[30] Foreign Application Priority Data

Jul. 5, 1993 [FI] Finland .................................. 933092

[51] Int. Cl.$^7$ .................................................. H04Q 7/22
[52] U.S. Cl. ............................................. 455/440; 455/436
[58] Field of Search .................................... 455/440, 438, 455/436; 370/322, 329, 331, 332

[56] References Cited

U.S. PATENT DOCUMENTS

| | | |
|---|---|---|
| 5,179,559 | 1/1993 | Crisler et al. . |
| 5,214,789 | 5/1993 | George .................................. 455/440 |
| 5,276,906 | 1/1994 | Felix ..................................... 455/438 |
| 5,327,575 | 7/1994 | Menich et al. ......................... 455/440 |
| 5,327,576 | 7/1994 | Uddenfeldt et al. .................. 455/436 |
| 5,355,515 | 10/1994 | Sicher .................................. 455/438 |

FOREIGN PATENT DOCUMENTS

| | | |
|---|---|---|
| 037 070 | 10/1981 | European Pat. Off. . |
| 186 229 | 7/1986 | European Pat. Off. . |
| 295 227 | 12/1988 | European Pat. Off. . |
| 564 429 | 10/1993 | European Pat. Off. . |
| 92/02105 | 2/1992 | WIPO . |

*Primary Examiner*—Dwayne D. Bost
*Assistant Examiner*—Myron K. Wyche
*Attorney, Agent, or Firm*—Pillsbury Madison & Sutro LLP

[57] ABSTRACT

In a digital time division multiple access (TDMA) radio system, the transmission times of mobile stations in a cell are advanced in relation to the base station of the cell each by a timing advance which compensates for the transmission delay caused by the distance between the base station and the respective mobile station. Part of the radio capacity of the cell is arranged to serve only within a first given timing advance range, and thereby to serve mobile stations located within a first given area of the cell, and another part of the radio capacity is arranged to serve only within a second given timing advance range, which is different from the first timing advance range, and thereby to serve mobile stations located with a second given area of the cell. The first and second areas may partially overlap. Handoffs between channels of the capacity are accomplished on the basis of exceeding or falling below threshold timing advance values.

20 Claims, 2 Drawing Sheets

TIME DIVISION MULTIPLE ACCESS RADIO SYSTEM, METHOD FOR INTRACELL CAPACITY ALLOCATION, AND METHOD FOR PERFORMING AN INTRA-CELL HANDOVER

This application claims benefits of international application PCT/FI94/00302, filed Jun. 30, 1994.

BACKGROUND OF THE INVENTION

The invention relates to digital time division multiple access (TDMA) radio systems, local intracell capacity allocation in such a radio system, and an intracell handover in such a radio system.

In digital Time Division Multiple Access (TDMA) radio systems, a plurality of mobile radio stations may utilize the same radio channel on a time division basis for communication with a base station. Communication on the radio channel takes place in a number of successive time slots, e.g. 8 time slots, allocated to the users as required. A mobile radio station is synchronized with a signal from the base station, and it transmits in accordance with this synchronization signal ("Sync") so that the signal from the mobile station is received at the base station in a time slot allocated for this particular mobile station. Mobile stations, however, may be located at different distances from the base station, whereby the propagation delay caused by this distance has to be taken into account in the synchronization of the timing of transmission of each mobile station with the base station so that the signal transmitted by each mobile station will be received at the base station in the right time slot. For this purpose, the base station measures the time difference between its own transmission and the transmission received from each respective mobile station, on the basis of which it defines a suitable timing advance for the respective mobile station. Each mobile station uses this timing advance to advance the time of its transmission relative to a basic time instant defined by the sync received from the base station. Various intrasystem features limit the timing advance to a certain maximum. This maximum of the timing advance, in turn, dictates the maximum cell size that any respective base station of the system is able to serve. In the pan-European mobile radio system GSM (Global System for Mobile Communication), for instance, the timing advance may vary in the range between 0 and 233 µs, which corresponds to a cell size with a maximum radius of 35 km.

In general, a cell in a radio system offers the same level of service within the entire area of the cell. In some cases, however, it may be necessary to allocate part of the radio capacity of the cell, either permanently or temporarily, merely to a certain area within the cell. It may be necessary to concentrate the capacity temporarily, for instance in cases of emergency or catastrophy, or at peak hours of an important traffic area (e.g. an airport). There have previously been attempts to allocate intracell radio capacity to some extent by the use of a sectored cell and directional antennas, but these means do not allow the capacity to be allocated to a certain geographical object in a sufficiently flexible, efficient and accurate manner.

SUMMARY OF THE INVENTION

An object of the present invention is to allow the radio capacity of a cell to be efficiently, flexibly and accurately allocated to a desired area within the cell.

These and other advantages are achieved with the method of the invention for local intracell capacity allocation in a time division multiple access (TDMA) radio system where the transmission time of a mobile station is advanced in relation to a base station of a cell by a timing advance which compensates for the transmission delay caused by the distance between the base station and the mobile station. The method is characterized by allocating part of the radio capacity of the cell to serve only within a given timing advance range and thereby mobile stations located within a given area of the cell, allocating another part of the radio capacity of the cell to serve only or primarily within another timing advance range and thereby mobile stations located within another area of the cell.

Another aspect of the invention is a time division multiple access (TDMA) radio system where the transmission time of a mobile station is advanced in relation to the base station of the cell by a timing advance which compensates for the transmission delay caused by the distance between the base station and the mobile station. The system according to the invention is characterized in that a first part of the radio capacity of the cell serves only within a given timing advance range and thereby mobile stations located within a given area of the cell, a second part of the radio capacity of the cell serves only within another timing advance range and thereby mobile stations located within another area of the cell.

The present invention utilizes the timing advance of TDMA radio systems in such a manner that at least part of the radio capacity of a cell is allocated merely to a given timing advance range and thereby to a given geographical object or area within the cell. When a connection to a mobile station is set up, the radio system checks the timing advance value assigned to the mobile station. Locally allocated radio capacity will be allocated to the mobile station only if the checking shows that the timing advance value of the mobile station is within that given timing advance range. If the timing advance value does not fall within the timing advance range, other radio capacity of the cell will be allocated to the mobile station if there is any available. In other words, mobile stations within a given area of the cell are prioritized so that in the case of congestion, they will be served with certainty or at least with a higher probability than mobile stations located elsewhere in the cell. In the event of a catastrophy, this may, for instance, signify almost complete blocking of service in all other areas.

Capacity allocation according to the invention on the basis of a timing advance is very simple to embody in the existing systems. In addition, the allocation can be rapidly and flexibly adapted to each situation simply by changing the limits set for the timing advance. By means of the timing advance, the capacity can be allocated very accurately to mobile stations located at a certain distance from the base station. When a directional antenna is used, the service area can, moreover, be very accurately defined even in the lateral direction in the cell.

A further object of the invention is a method for performing an intracell handover in a time division multiple access (TDMA) radio system where the transmission time of a mobile station is advanced in relation to the base station of the cell by a timing advance which compensates for the transmission delay caused by the distance between the base station and the mobile station. The method is characterized in that the method comprises allocating a first group of traffic channels of the cell to serve only within a first timing advance range and thereby mobile stations located within a first area of the cell, allocating a second group of traffic channels of the cell to serve only within a second timing advance range and thereby mobile stations located within a second area of the cell, the first and the second timing advance ranges overlapping each other, monitoring the timing advance of mobile stations, performing a handover between the first and the second traffic channel group on the basis of the timing advance assigned to the mobile station. An intracell handover between two service areas formed on the basis of the timing advance is performed using the timing advance value assigned to the mobile station MS as the criterion.

BRIEF DESCRIPTION OF THE DRAWINGS

In the following, the invention will be described in more detail by means of embodiments with reference to the accompanying drawings, in which.

The present invention is intended to be applied in any radio network utilizing digital time division multiple access (TDMA) and employing a timing advance to shift the time of transmission of a mobile radio station relative to the time instant set by a sync signal transmitted from the base station in such a way that the timing advance compensates for the transmission delay caused by the distance between the base station and the mobile station, and the transmission of the mobile station is received at the base station in the correct TDMA time slot. The invention is especially suitable for use in the GSM and DCS1800 mobile radio systems.

Figure 1:
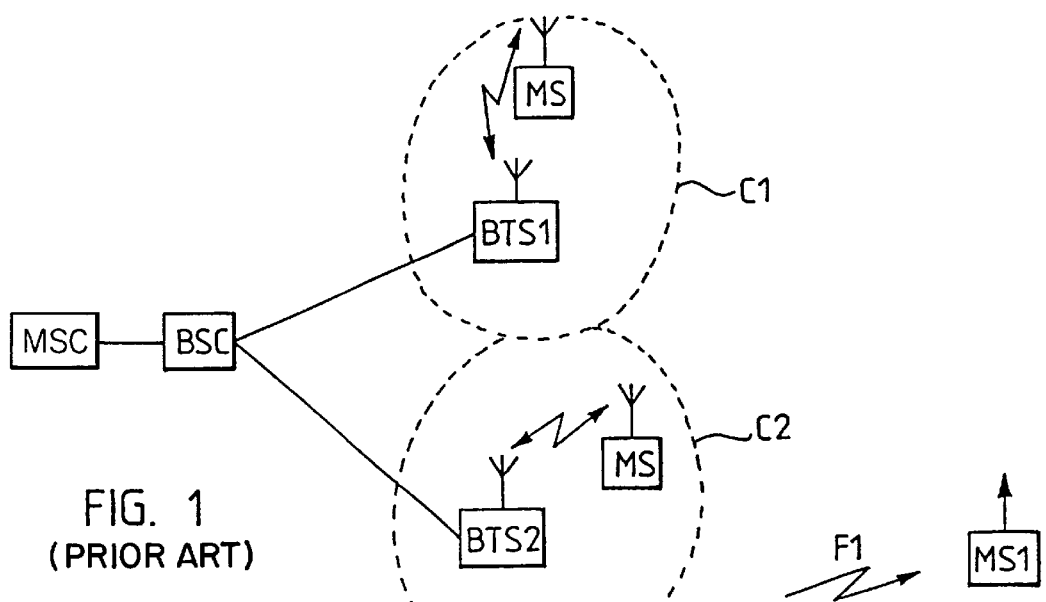
FIG. 1 illustrates the GSM radio system.

The GSM (Global System for Mobile Communications) is a pan-European mobile telephone system which is evolving into a world-wide standard. FIG. 1 shows the basic structural elements of the GSM system in a simplified manner without a detailed description of their properties or the other parts of the system. For a more accurate description of the GSM system, reference is made to the GSM recommendations and "The GSM System for Mobile Communications" by M. Mouly and M-B. Pautet, Palaiseau, France, 1992, ISBN: 2-9507190-0-7. A mobile exchange MSC switches incoming and outgoing calls. Its functions are similar to those of an exchange in a public switched telephone network. In addition, the mobile exchange has functions typical of only mobile communications, such as subscriber location management. Mobile stations MS are connected to the exchange MSC by means of base station systems. A base station system comprises a base station controller BSC and base stations BTS. A base station controller BSC is used for controlling a plurality of base stations BTS. The BSC performs, for example, handovers in cases where the handover takes place within the base station or between two base stations controlled by the same BSC. FIG. 1 shows a base station system where the base station controller BSC is connected to two base stations BTS1 and BTS2, the radio coverage areas of which form corresponding radio cells C1 and C2. In conventional systems, the capacity of a base station BTS is evenly allocated to serve the entire coverage area of the base station, i.e. the cells C1, C2 respectively served by base stations BTS1 and BTS2. To allocate the capacity differently to different areas within the cell has been possible only to a certain extent by the use of a sectored cell or directional antennas.

Figure 2:
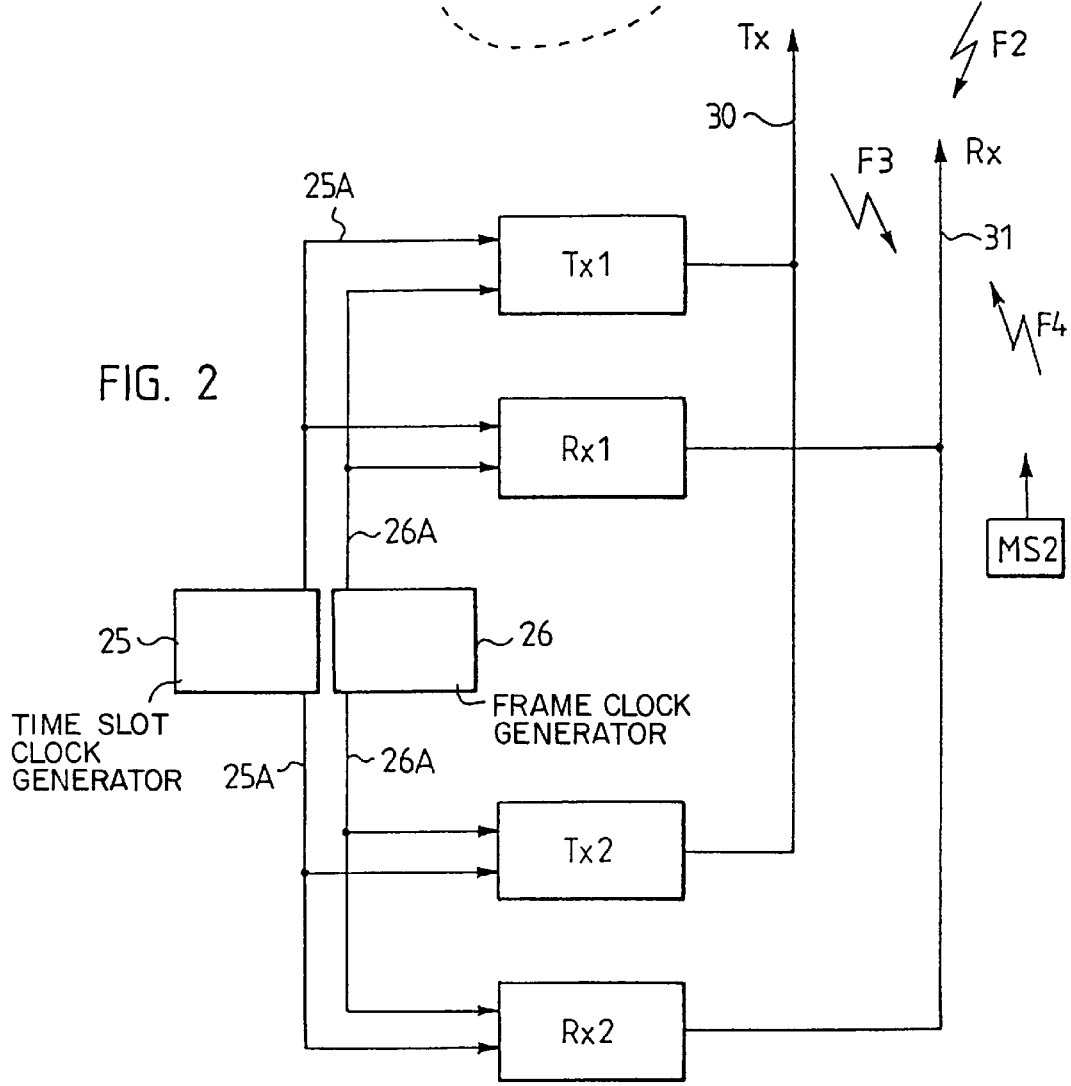
FIG. 2 illustrates a base station according to the invention.

The present invention utilizes the timing advance of a mobile station MS for local intracell allocation of radio capacity. FIG. 2 illustrates a base station according to the invention in a TDMA radio system. As regards the base station, only parts and functions essential to the understanding of the invention will be described. In addition, the use of the timing advance in the TDMA system will be described.

Figure 3:
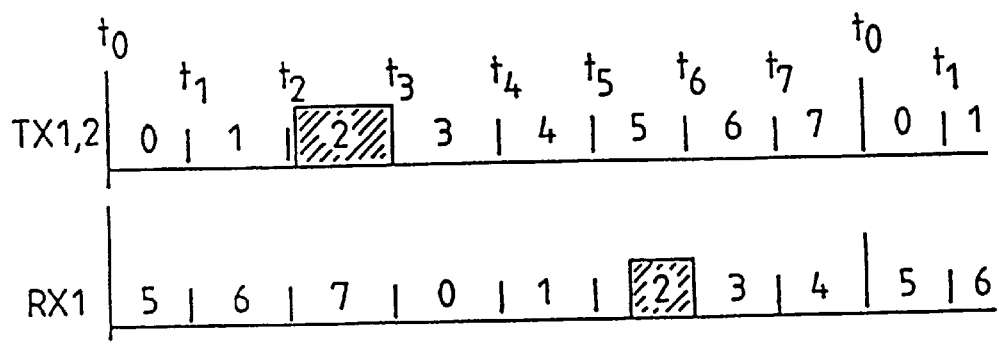
FIG. 3 illustrates the timing of the base station.

In FIG. 2, a radio transmitter Tx1 and a radio receiver Rx1 form a transceiver fully similar to a conventional base station transceiver in structure and operation. A time slot clock generator 25 and a frame clock generator 26 of the base station generate a time slot clock 25A and a frame clock 26A, respectively, required for the transceiver. Referring to FIG. 3, the TDMA frame period of the transceiver Tx1/Rx1 starts at a time $t_0$ defined by the frame clock pulse 26A, and the first time slot of the frame begins at the same time. The succeeding time slots of the frame begin at times $t_1$–$t_7$ determined by the time slot clock pulses 25A, until a new frame begins at a time $t_0$ determined by a new frame clock pulse 26A. In this specific case, one frame thus contains 8 time slots, but the number of time slots may be smaller or greater, e.g. 4, depending on the system. In FIG. 3, the time slots are numbered from TS0 to TS7. In the transceiver Tx1/Rx1, operating in a normal way, the frame periods of both the receiver and the transmitter begin at the same time $t_0$. Correspondingly, the time slots begin at the same times $t_0$–$t_7$. Time slot numberings, however, differ (in this exemplary system) in that each time slot number occurs on the reception side three time slots later than the respective time slot number on the transmission side.

The operation of the transceiver Tx1/Rx1 will be discussed with reference to FIGS. 2 and 3 while assuming that a mobile radio station MS1 and the transceiver Tx1/Rx1 communicate in the TDMA time slot 2. Under the control of the clock signals 25A and 26A, the transmitter Tx1 starts the transmission of a burst addressed to the mobile station MS1 after the time $t_2$. The assembled radio-frequency burst is transmitted via a transmitting antenna 30 to the mobile station MS1 on a carrier F1. The mobile station MS1 receives the burst, is synchronized with the base station on the basis of synchronizing information contained in the burst, and transmits the radio-frequency burst to the base station on a carrier F2 approximately 3 time slots later. The receiver Rx1 receives the burst via a receiving antenna 31 in the reception time slot 2 between $t_5$ and $t_6$. Successful reception requires that the burst received from the mobile station MS1 should fall within the right time slot at the receiver Rx1. However, if the mobile station MS1 is remote from the base station, propagation delays caused by the distance may delay the burst to such an extent that bursts from mobile stations MS using adjacent time slots overlap. For this reason, the transceiver Tx1/Rx1 measures the time difference occurring between the transmissions of the transceiver and the mobile station due to the distance between the base station and the mobile station. On the basis of the measurement, the transceiver calculates a timing advance required for the mobile station for compensating for the propagation delay caused by the distance. The base station signals this timing advance information to the mobile station MS1, which advances its time of transmission from the time determined by the burst received from the base station by the timing advance. In this way, the burst transmitted by the mobile station will reach the base station receiver Rx1 at the right time. Various intrasystem limitations, however, set a maximum value $A/D_{MAX}$ for the timing advance, and this maximum value in turn determines the maximum distance at which the propagation delay can still be compensated for. FIG. 2 also shows another transceiver Tx2/Rx2, which is identical with the transceiver Tx1/Rx1 except that it transmits on a carrier F3 and receives on a carrier F4.

Figure 4:
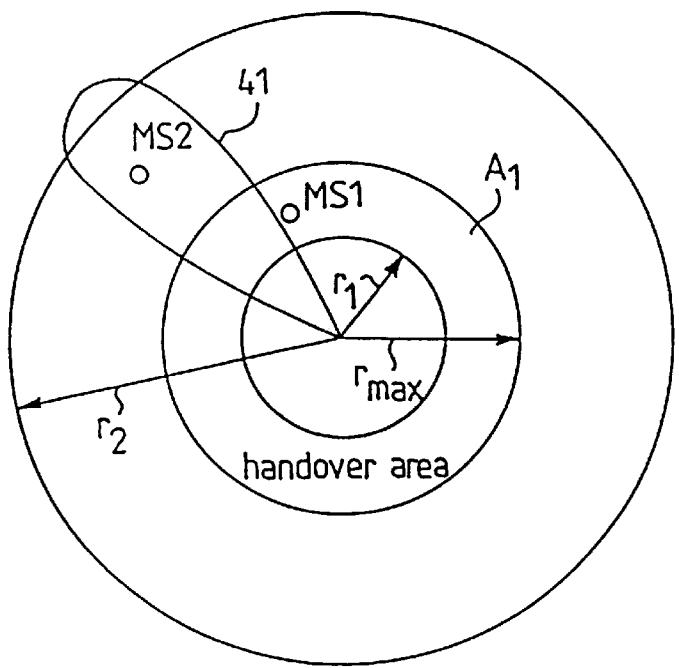
FIG. 4 illustrates a cell according to the invention.

The transceiver Tx2/Rx2 is dedicated to serve only mobile stations MS whose timing advance falls within a given range, in the example between $A/D_1$ and $A/D_{MAX}$, the widest possible timing advance range being from 0 to $A/D_{MAX}$. With reference to FIG. 4, $A/D_{MAX}$ corresponds to the distance $r_2$ from the base station and $A/D_1$ corresponds to the distance $r_1$ from the base station. The transceiver Tx2/Rx2 thus serves only those mobile stations which are at a distance of $r_1$ to $r_2$ from the base station. Accordingly, Tx2/Rx2 does not serve those mobile stations MS whose timing advance is smaller than $A/D_1$ and whose distance from the base station is shorter than $r_1$. The immediate vicinity of the base station is served by the transceiver Tx1/Rx1, which accepts only those mobile stations which are within the timing advance range of 0 to $A/D_2$, i.e. at a distance of 0 to $r_3$ from the base station. The values are preferably selected in such a way that $A/D_2 > A/D_1$ and $r_3 > r_1$; the service areas of the transceivers Tx1/Rx1 and Tx2/Rx2 thus overlap to some extent, forming a handover area, which allows an interference-free handover within the base station from one transceiver to the other.

In the manner described above, the radio capacity of the base station can be allocated unevenly to different areas of the cell. For instance, the area $r_1-r_2$ may be allocated 80% of the capacity of the cell, while the area $0-r_3$ is allocated only 20% of the capacity. A cell may also contain several areas of this kind. It is also possible to allocate part of the capacity in a normal manner to the area of the entire cell and only a certain part of the capacity to a more accurately defined area. The system may put these areas to use only at certain peak periods, e.g. according to the time or date, or the load in the network, while at other times the capacity of the entire cell is used in the normal way. The radio system may also dynamically change the timing advance ranges according to the date, time or the load in the network. The above-mentioned adjustments are preferably performed, for example, by the exchange MSC, the base station controller BSC, or the operating and maintenance centre OMC of the network although some of them can also be performed locally at the base station, for instance by means of the timer function.

FIG. 4 shows a circular cell, which is achieved under ideal conditions by an omnidirectional antenna; the use of a directional antenna, in the ideal case, provides a conical or elliptical cell shape. In practice, the cell shapes are less definite due to the topology of the terrain and for other reasons, as is known to those skilled in the art.

The timing advance allows the area, i.e. the distances, for which service is provided to be very accurately defined in the radial direction. If a directional antenna is used, the service area can also be defined in the circumferential direction, as illustrated by a radiation beam 41 is FIG. 4. In this case, an intracell service area according to the invention can be very accurately defined according to a desired object, such as an airport.

In the example shown in FIG. 2, the transceivers of the base station are dedicated to serve different areas within the cell. In practice this means that given radio channels can be used only in a certain area. Alternatively, it is also possible, however, to assign different time slots, i.e. traffic channels, of one transceiver to different areas within the cell. It may also be advantageous if the allocation of radio channels or traffic channels to different areas can be adjusted according to the time or the load in the same manner as the timing advance ranges of the invention.

In addition to a conventional cell, the invention can also be applied to a so-called extended cell, which is described in the co-pending application entitled "Base station", having the same inventor and applicant as the present application.

When a mobile station MS moves during a call from one service area of the invention to another within a cell, the base station must perform an internal handover. According to the invention, the handover criterion used is the timing advance assigned to the mobile station. For instance, when a mobile station MS located within the service area $r_1-r_2$ moves in the direction indicated by the arrow A1 to the service area $0-r_3$, the base station performs a forced intracell handover when the timing advance assigned to the mobile station MS falls below a predetermined value. Correspondingly, when the mobile station MS moves from the service area $0-r_3$ to the service area $r_1-r_2$, the base station performs a forced intracell handover when the timing advance assigned to the mobile station MS exceeds a predetermined value. The handover can be controlled by a control unit within the base station, the base station controller BSC or the exchange MSC, depending on the system.

The figures and the description relating to them are intended only to illustrate the present invention. In its details, the methods and radio system according to the invention may be modified within the scope of the appended claims.

I claim:

1. A method for local intracell radio capacity allocation of a cell in a time division multiple access (TDMA) radio system where a transmission time of each of a plurality of mobile stations is advanced in relation to a base station of the cell by a timing advance which compensates for the respective transmission delay caused by a distance between the base station and each of the respective mobile stations, comprising:

allocating a first part of the radio capacity of the cell to serve only within a first given timing advance range and thereby mobile stations located within a first given area of the cell, and allocating a second part of the radio capacity of the cell to serve only or primarily within a second given timing which is different from said first timing advance range, and thereby mobile stations located within a second given area of the cell, wherein said allocating a first part and said allocating a second part of the radio capacity of the cell comprise allocating at least one transceiver comprising said first part, and allocating at least another transceiver comprising said second part.

2. The method according to claim 1, wherein: said given timing advance range and said second given timing advance range partially overlap.

3. A time division multiple access (TDMA) radio system where a transmission time of each of a plurality of mobile stations is advanced in relation to a base station of a cell by a timing advance which compensates for a respective transmission delay caused by a distance between the base station and each of the respective mobile stations, comprising:

said cell having a radio capacity, a first part of which is arranged to serve only within a first given timing advance range and thereby mobile stations located within a first given area of the cell, and a second part which is arranged to serve only within a second given timing advance range which is different from said first given timing advance range, and thereby mobile stations located within a second given area of the cell, wherein said first part and said second part of said radio capacity, respectively, comprise at least one transceiver and at least another transceiver.

4. The radio system according to claim 3, wherein: said radio capacity is arranged such that said first given timing advance range and said second given timing advance range partially overlap.

5. A method for performing an intracell handover in a cell of a time division multiple access (TDMA) radio system where a transmission time of each of a plurality of mobile stations is advanced in relation to a base station of the cell by a timing advance which compensates for a respective transmission delay caused by a distance between the base station and each of the respective mobile stations, comprising:

allocating a first group of traffic channels of the cell to serve only within a first timing advance range and thereby mobile stations located within a first area of the cell, said first group of traffic channels being provided by at least one transceiver, allocating a second group of traffic channels of the cell to serve only within a second timing advance range, which is different from said first timing advance range, and thereby mobile stations located within a second area of the cell, the first and the second timing advance ranges partially overlapping each other, and said second group of traffic channels being provided by at least another transceiver, monitoring the respective timing advances of respective ones of said mobile stations, performing a handover of one of said mobile stations between the first and the second traffic channel group based on the timing advance assigned to the respective mobile station.

6. The method according to claim 5, comprising:

conducting said performing when the timing advance of said mobile station, while located within said first area, exceeds a predetermined value.

7. The method according to claim 5, comprising:

conducting said performing when the timing advance of said mobile station, while located within said second area, falls below a predetermined value.

8. The method according to claim 6, comprising: conducting said performing when the timing advance of said mobile station, while located within the second area, falls below a predetermined value.

9. The method according to claim 1, wherein:

said first part and said second part of the radio capacity of said cell both provide like numbers of TDMA time slots per frame allocated to mobile stations respectively in said first given area and said second given area.

10. The method according to claim 1, further comprising:

dynamically changing said allocating by changing at least one of said first given timing range and said second given timing range.

11. The radio system according to claim 3, wherein:

said first part and said second part of the radio capacity of said cell are both arranged to provide like numbers of slots per frame allocated to mobile stations respectively in said first given area and said second given area.

12. The radio system according to claim 3, further including:

said radio capacity being dynamically reallocatable by changing at least one of said first given timing range.

13. The method according to claim 5, wherein:

said first channel group and said second channel group provide like numbers of TDMA time slots per frame allocated to mobile stations respectively within said first area and said second area.

14. The method according to claim 5, further comprising:

dynamically changing said allocating by changing at least one of said first timing range and said second timing range.

15. A method for local intracell radio capacity allocation of a cell having a respective whole area, in a time division multiple access (TDMA) radio system where a transmission time of each of a plurality of mobile stations is advanced in relation to a base station of the cell by a timing advance which compensates for a respective transmission delay caused by a distance between the base station and each of the respective mobile stations, comprising:

allocating a first part of the radio capacity of the cell to serve within said whole area of the cell; and allocating a second part of the radio capacity of the cell to serve only or primarily within a given timing advance range and thereby mobile stations located within a given area of the cell which is smaller than said whole area of the cell, wherein said allocating of said second part of the radio capacity includes allocating said second part of the radio capacity to serve within said given timing advance range during predetermined traffic-peak situations, and allocating said second part of the radio capacity to serve the whole area of the cell at other times.

16. A time division multiple access (TDMA) radio system where a transmission time of each of a plurality of mobile stations is advanced in relation to a base station serving a cell having a whole area, by a timing advance which compensates for a respective transmission delay caused by a distance between the base station and each of the respective mobile stations, comprising:

said cell having a radio capacity a first part of which is arranged to serve mobile stations located within said whole area of the cell, and a second part of which is arranged to serve only within a given timing advance range, and thereby mobile stations located within a given area of the cell which is smaller than said whole area of the cell, wherein said first part includes a directional antenna having a narrow radiation beam, and said second part is arranged to serve within said given timing advance area within said radiation beam of said directional antenna.

17. A method for local intracell radio capacity allocation of a cell in a time division multiple access (TDMA) radio system where a transmission time of each of a plurality of mobile stations is advanced in relation to a base station of the cell by a timing advance which compensates for a respective transmission delay caused by a distance between the base station and each of the respective mobile stations, comprising the steps as the steps of:

determining a time advance value for a mobile station;

checking whether the determined timing advance is within a first given timing advance range, or within a second given timing advance range; and allocating, to the mobile station, a radio resource among a first part of the radio capacity of the cell assigned to serve a first given area of the cell, if the determined timing advance falls within said first given timing advance range, but allocating to the mobile station a radio resource among a second part of the radio capacity of the cell assigned to serve a second given area of the cell, if the determined timing advance falls within said second given timing advance range, wherein said allocating the radio resource among the first part and said allocating the radio resource among the second part of the radio capacity of the cell comprise allocating at least one transceiver comprising said first part, and allocating at least another transceiver comprising said second part.

18. A method for local intracell radio capacity allocation of a cell in a time division multiple access (TDMA) radio system where a transmission time of each of a plurality of mobile stations is advanced in relation to a basic station of the cell by a timing advance which compensates for a respective transmission delay caused by a distance between the base station and each of the respective mobile stations, comprising:

allocating a first part of a traffic channel capacity of the cell to serve only within a first given timing advance range and thereby mobile stations located within a first given area of the cell, and allocating a second part of the traffic channel capacity of the cell to serve only or primarily within a second given timing which is different from said first timing advance range, and thereby mobile stations located within a second given area of the cell, said allocating a first part and said allocating a second part of the traffic channel capacity of the cell comprise allocating at least one transceiver comprising said first part, and allocating at least another transceiver comprising said second part.

19. A time division multiple access (TDMA) radio system where a transmission time of each of a plurality of mobile stations is advanced in relation to a base station of a cell by a timing advance which compensates for a respective transmission delay caused by a distance between the base station and each of the respective mobile stations, comprising the steps of:

said cell having a traffic channel capacity, a first part of which is arranged to serve only within a first given timing advance range, and thereby mobile stations located within a first given area of the cell, and a second part which is arranged to serve only within a second given timing advance range, which is different from said first given timing advance range, and thereby mobile stations located within a second given area of the cell, said first part and said second part of said traffic channel capacity, respectively, comprise at least one transceiver and at least another transceiver.

20. A method for performing an intracell handover in a cell of a time division multiple access (TDMA) radio system where a transmission time of each of a plurality of mobile stations is advanced in relation to a base station of the cell by a timing advance which compensates for a respective transmission delay caused by a distance between the base station and each of the respective mobile stations, comprising the steps of:

allocating a first group of traffic channels of the cell to serve only within a first timing advance range and thereby mobile stations located within a first area of the cell, allocating a second group of traffic channels of the cell to serve only within a second timing advance range, which is different from said first timing advance range, and thereby mobile stations located within a second area of the cell, the first and the second timing advance ranges partially overlapping each other, monitoring the respective tiring advances of respective ones of said mobile stations, performing a handover of one of said mobile stations between the first and the second traffic channel group based on the timing advance assigned to the respective mobile station, wherein said first channel group and said second channel group provide like numbers of TDMA time slots per frame allocated to mobile stations, respectively, within said first area and said second area.

\* \* \* \* \*